(No Model.)
L. LUPPEN.
HARROW.
No. 255,876. Patented Apr. 4, 1882.
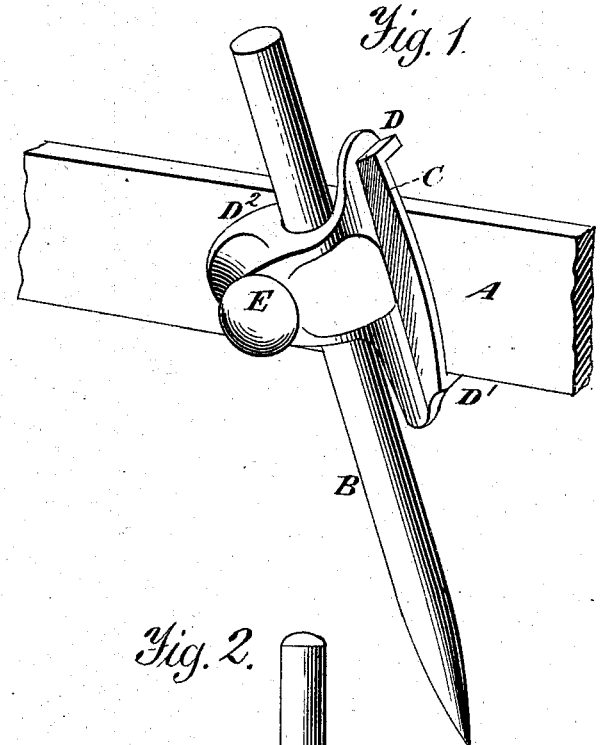
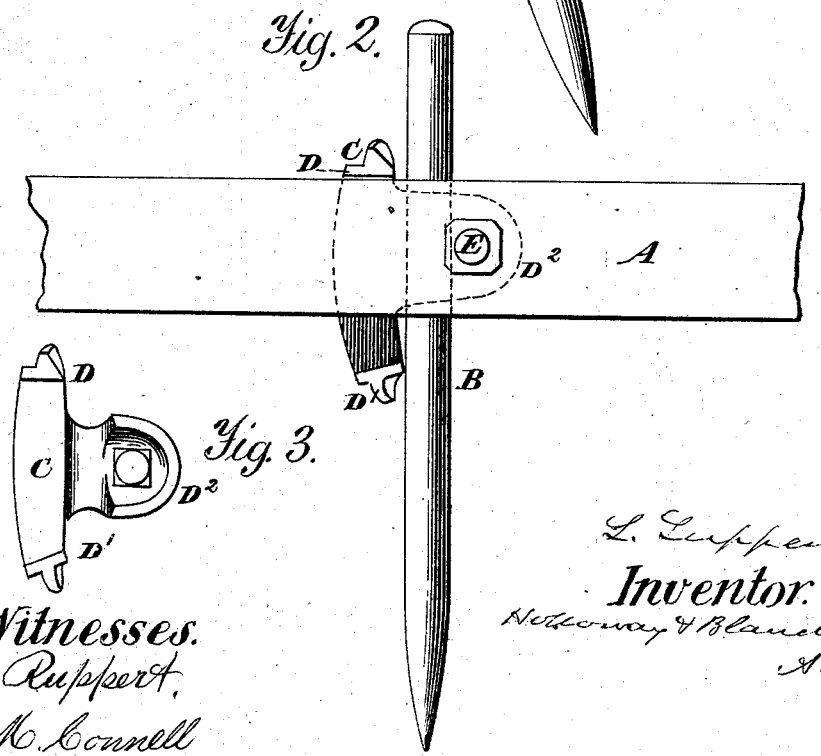
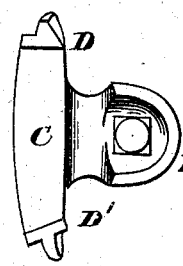
Witnesses.
A. Ruppert
C. M. Connell
L. Luppen
Inventor.
Holloway & Blanchard
Attys

UNITED STATES PATENT OFFICE.

LUPPE LUPPEN, OF PEKIN, ILLINOIS.

HARROW.

SPECIFICATION forming part of Letters Patent No. 255,876, dated April 4, 1882.

Application filed November 22, 1881. (No model.)

*To all whom it may concern:*

Be it known that I, LUPPE LUPPEN, a citizen of the United States, residing at Pekin, in the county of Tazewell and State of Illinois, have invented certain new and useful Improvements in Harrows; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in harrows; and the object of my improvements is to provide a clip for holding the teeth of the harrow in a vertical position, or at such an angle to the frame thereof as may be desired. I attain this object by the devices and combinations thereof illustrated in the accompanying drawings, in which—

Figure 1 is a perspective view, showing a portion of the frame of a harrow, a harrow-tooth, a clip for holding the tooth in position, and a bolt for attaching the clip to the frame. Fig. 2 is an elevation, partly in section, showing the parts above enumerated, with the tooth in a vertical position; and Fig. 3 is a detached view, showing the construction of the clip.

Similar letters refer to similar parts throughout the several views.

In constructing harrows with my improvements attached I provide any suitable form of frame-work, A, which may be of wood or of metal, the bars of which may be joined together in the form of a V, or it may be rectangular, or of any other form that is required.

At the point where the tooth B is to be attached to the frame there is placed a clip, C, which consists of a bar of metal having upon its upper and lower ends shoulders or projections D D', and upon one of its sides a projecting ear, D², which is provided with an aperture for the passage of a bolt, E, which secures the clip to the frame. This form of clip, when the teeth are set in a vertical position, as shown in Fig. 2, in which position they are placed when the implement is used for pulverizing the ground, permits their being moved into an angular position by the shoulder or projection D coming in contact with the upper surface of the frame—the harrow being supposed to be moving to the left—the teeth being passed through a semicircular recess formed on the interior of the clip, as is shown in Fig. 3, it being retained in its position by the bolt E.

When the harrow is to be used for covering seed that has been sown the bolt E is slackened and the clip turned into an angular position, as shown in Fig. 1, and again tightened, when the teeth will be held in their changed angular position, which is the most desirable one for seeding or covering seed sown.

I am aware that clips for holding harrow-teeth upon their frames which permit them to be set vertically and at an angle, broadly considered, are not novel, such a device being shown in a patent, No. 229,788, granted to F. G. Winnek on the 6th of July, 1880, and hence I do not claim such a clip broadly; but,

Having thus described my invention, what I claim, and desire to secure by Letters Patent, is—

1. The clip C, constructed substantially as shown and described, it having its pivotal point in a lug projecting from one side thereof, and being provided with a groove for the reception of the harrow-teeth, and with projections D and D' for determining the positions of the teeth, as set forth.

2. The combination of the clip C, having in it a groove for the reception of the tooth of a harrow, a pivotal point in a projection formed on one of its sides, and projecting lugs for determining the positions of the teeth, and a clamping-bolt for securing the clip to the beam of a harrow, the parts being constructed and arranged substantially as shown and described.

In testimony whereof I affix my signature in presence of two witnesses.

LUPPE LUPPEN.

Witnesses:
MENNE BEHRENS,
PHILIPP SCHEMBER.